Nov. 14, 1939.   A. L. FREEDLANDER   2,179,691
BELT
Filed Jan. 20, 1938
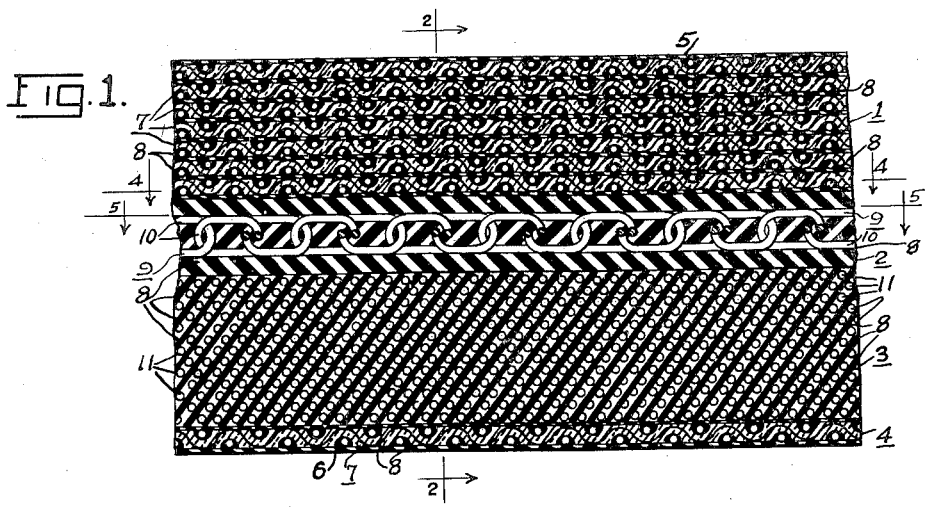
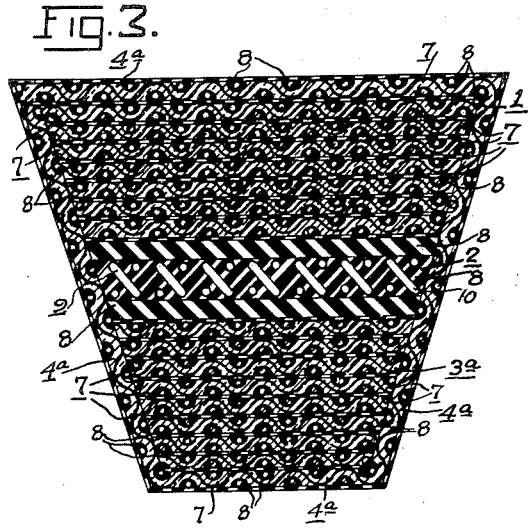
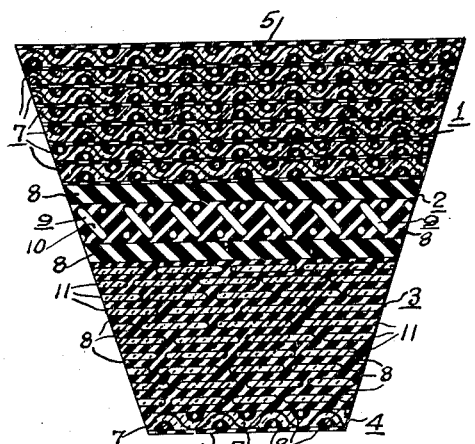
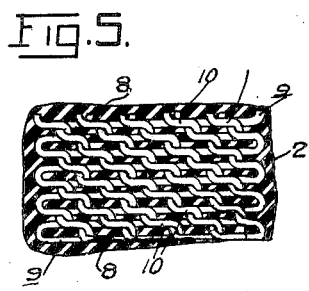
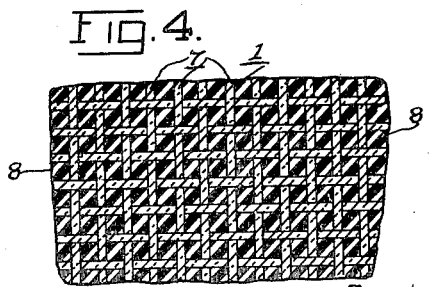
Inventor
ABRAHAM L. FREEDLANDER,
By Toulmin & Toulmin
Attorneys Patented Nov. 14, 1939

2,179,691

UNITED STATES PATENT OFFICE 2,179,691

BELT

Abraham L. Freedlander, Dayton, Ohio, assignor to The Dayton Rubber Manufacturing Company, Dayton, Ohio, a corporation of Ohio Application January 20, 1938, Serial No. 185,944

4 Claims. (Cl. 74—233)

This invention relates to belts.

It is an object of this invention to provide a power transmission belt having a body which is constituted of porous spun glass filled with rubber, or synthetic rubber, and which is optionally provided with a neutral axis section formed of flexible, longitudinally inextensible, articulated metal mesh imbedded in rubber or synthetic rubber.

It is a further object of this invention to provide such a structure wherein burning of the belt, due to friction, is obviated because the constituent glass fabric and/or fibers will not support combustion.

It is a further object of this invention to provide, in a belt construction, a tension section formed of longitudinally inextensible spun glass fabric having tensile strength superior to that of steel, and which is flexible and supported in an interlocking resilient cushion of rubber, or synthetic rubber, in such manner that the interlocking relationship between the glass fabric and the resilient supporting material will permit sufficient relative movement therebetween to accommodate the necessary bending of the glass belt material in passing over pulleys of relatively small diameter.

It is a further object of this invention to provide, in such a belt construction, a compression section formed of spun glass fabric interlocked in a resilient cushion of rubber or synthetic rubber.

It is a further object of this invention to provide, in such a belt construction, a neutral axis member or section disposed between the tension section and compression section in the belt body which is formed of flexible, longitudinally inextensible, articulated metal mesh imbedded in rubber, or synthetic rubber, and provided with interstices of such size as to provide for extension therethrough, from side to side of the metal mesh, of sufficient resilient rubber, or synthetic rubber, as to provide for resilient connection between the rubber, or synthetic rubber, at opposite sides of the mesh, to such extent as to produce a member or section possessed of the desirable properties and advantages of a member formed of rubber, with the additional desirable properties of increased strength and longitudinal inextensibility.

It is a further object of this invention to provide such a belt structure which is totally oil-proof due to the fact that the glass fabric and/or fibers are non-absorptive with respect to oil and, therefore, oil-proof and due to the fact that the synthetic rubber cushioning material is also oil-proof.

It is a further object of this invention to provide such a belt construction which, in addition to possessing the advantageous properties of belts constructed of textile fibers and/or fabric imbedded in rubber, possesses also tensile strength superior to such construction as well as oil-proofness.

It is a further object of this invention to provide a belt construction wherein, due to independence of adhesion between the porous spun glass fabric and/or fibrous material and the interlocked resilient belt material, the ultimate degree of flexibility in operation is secured.

These and other objects and advantages will appear from the following description taken in connection with the drawing.

In the drawing:

Figure 1 is a fragmentary longitudinal section of a belt constructed according to the principles of this invention;

Figure 2 is a transverse section taken on the line 2—2 of Figure 1;

Figure 3 is a view, similar to Figure 2, of a modified belt construction;

Figure 4 is a section taken on the line 4—4 of Figure 1; and

Figure 5 is a section taken on the line 5—5 of Figure 1.

Formerly, in the construction of belts from textile fabrics and fibers imbedded in, or impregnated with, vulcanized rubber, rupture of the belt and consequent failure in operation generally occurred through separation of the textile material and rubber because of the dependence, for connection of the various portions of the belt, upon the bond existing between the rubber and the textile fabric.

According to the principles of this invention, all or the greater part of the belt body is formed of spun glass which is sufficiently porous, or provided with interstices in such number and of such size as to permit the extension therethrough of cushioning resilient material such as rubber, or synthetic rubber, in such manner that the interlocking relationship of the rubber and glass is sufficient alone to provide and maintain resilient connection between the various portions of the belt totally independently of adhesion between the glass and the resilient cushioning material.

Furthermore, where the construction of oil-proof, or, oil-resistant, belt materials was attempted, although sufficient resistance of certain resilient materials to attack of oil and the like was known, nevertheless, the textile material was so highly absorbent with respect to oil that absorption of oil thereby in sufficient quantity to destroy the bond between textile and resilient materials most often resulted.

In some cases, it was proposed to protect the body or carcass of the belt from the attack of oil and the like by means of a thin exterior coating of oil-resistant material. Such proofing has been found to be temporary, at most, because of the removal of the protective coating by wear.

According to the principles of this invention, the body or carcass of the belt, or certain sections thereof, is formed of porous spun glass fabric or fibers impregnated with or imbedded in oil-proof synthetic rubber in such manner as to form a belt body, carcass, or section, which is uniformly and entirely oil-proof. In addition to the above advantages, the spun glass material is possessed of tensile strength greatly in excess of that possessed by known textile materials, and even steel, while possessed of sufficient flexibility for the purpose for which it is utilized by me.

Also, according to the principles of this invention, the setting afire of the belt, under excessive friction, is totally prevented because the spun glass fibers and fabric will not support combustion.

Referring to the drawing in detail, in the construction illustrated in Figures 1 and 2, the belt comprises the tension section or member 1 disposed at the outside of the belt beneath, or inside, and adjacent which is the neutral axis section or member 2 which is adjacent and superposed on the inwardly disposed compression section or member 3. Secured to the inner surface of the compression section or member 3 is a breaker strip 4. A thin protective surface layer 5 of rubber is secured on the tension section or member 1 at the outside of the belt and a similar layer 6 is disposed on the inside, or lower, surface of the breaker strip 4. The body or carcass of the belt is thus composed of the permanently secured tension section 1, neutral axis section 2, compression section 3, breaker strip 4 and surface layers 5 and 6.

The tension section or member 1 is formed of a plurality of superposed layers of straight laid, square woven spun glass fabric 7 which has the threads thereof sufficiently spaced to provide adequate interstices for the extension therethrough of sufficient rubber 8 to provide substantially shear-proof connection between the rubber at opposite sides of each fabric layer 7 (see Fig. 4). The body or carcass of the section 1, therefore, comprises highly porous spun glass material having interstices thereof filled with rubber, or synthetic rubber 8, in sufficient quantity to provide an intensely interlocked resilient cushioning connection between the layers 7 of spun glass fabric.

The spun glass fabric 7 is possessed of tensile strength far in excess of textile material of commensurate proportions. In fact, the tensile strength of spun glass is greater than that of steel. Due to the square-woven, straight laid disposition of the spun glass fabric 7, it is freely bendable about transverse axes and, therefore, the tension section 1, in addition to possessing a desired degree of tensile strength, is freely bendable and the layers 7 of spun glass fabric are connected by an interlocked cushion of resilient material, such as rubber, or synthetic rubber, in such manner that the bending of the tension section or member 1 may take place freely despite the longitudinal inextensibility and the transverse incompressibility of the spun glass fabric 7.

The section 2, which is designated as the neutral axis section or member and which has the neutral axis of the belt disposed therein, is formed of substantially longitudinally inextensible articulated metal mesh generally designated 9 which is imbedded in resilient rubber or synthetic rubber 8, as shown particularly in Figure 5. As is also shown particularly in Figure 5, the articulated metal mesh 9 comprises a plurality of transversely disposed interlocked sinuous strands 10 formed of bent wire of any suitable material such as brass, steel or the like.

The mesh 9 is provided with such interstices as to permit the extension therethrough of rubber, synthetic rubber, or the like 8, in such quantity, from the material 8 at opposite sides of the mesh 9 as to form such substantially shear-proof resilient connection between the material 8 at opposite sides of the mesh 9 as to produce a section or member 2 having substantially the flexibility and resiliency of unreinforced rubber, or synthetic rubber, 8, while at the same time having additional tensile strength due to the longitudinal inextensibility of the mesh 9.

As is clearly shown in Figures 1 and 2, the mesh 9 is separated from the tension section or member 1 by a sheet, or zone, of resilient material 8 of substantial depth. The mesh is likewise separated by a sheet or zone of similar thickness from the compression section or member 3.

The compression section or member 3, as shown in Figures 1 and 2, is formed of parallel transversely disposed threads or fibers 11 of spun glass (size exaggerated) which are imbedded in and surrounded by rubber or synthetic rubber 8 which thus forms an interlocking cushion therefor and permits of compression of the compression section 3 despite the incompressibility of the spun glass fibers 11.

The breaker strip 4 is formed of one or more layers of spun glass fabric 7 provided with an interlocking impregnation of rubber or synthetic rubber 8. As will be most clearly understood, the size or coarseness of the layers of spun glass fabric 7 and the spun glass fibers 11, is highly exaggerated in the interest of clearness of disclosure. Thus, the belt body or carcass illustrated in Figures 1 and 2 comprises the tension section or member 1 disposed outwardly thereof and formed of a plurality of superposed layers of spun glass fabric interlockingly imbedded in rubber or synthetic rubber 8 and provided with a surface covering 5 of rubber or synthetic rubber and the intermediate or neutral axis section or member 2 formed of longitudinally inextensible articulated metal mesh 9 interlockingly imbedded in rubber or synthetic rubber 8 and the inwardly disposed compression section or member 3 formed of transversely disposed parallel spun glass threads or fibers 11 interlockingly imbedded in rubber or synthetic rubber 8 and having its outer side secured to the neutral axis section or member 2, while the breaker strip 4 of spun glass fabric 7 interlockingly imbedded in rubber 8 is secured to the inner side thereof and itself provided on its inner surface with the inner surface layers 6 of rubber or synthetic rubber.

In forming the belt, the respective sections 1, 2 and 3 and the breaker strip 4 are preferably formed by imbedding the spun glass fabric 7, longitudinally inextensible metal mesh 9 and transverse fibers 11 in vulcanizable rubber or synthetic rubber and uniting the sections 1, 2 and 3 and the breaker strip 4, preferably under pressure in a mold, and thereafter vulcanizing the component parts of the belt into a single unitary belt carcass or body formed of rubber or synthetic rubber 8 reinforced in the tension section with spun glass fabric 7, in the intermediate or neutral axis section or member 2 with longitudinally inextensible flexible articulated metal mesh, in the compression section or member 3 with transversely disposed parallel spun glass fibers 11 and in the breaker strip 4 with spun glass fabric 7.

As an alternative construction, where the utmost tensile strength is desired and where the use for which the belt is intended is such as to make the utmost bendability unnecessary, the construction illustrated in Figure 3 is provided as a modification for that illustrated in Figures 1 and 2.

As shown in Figure 3, the tension section or member 1 is formed of superposed layers of spun glass fabric 7 interlockingly imbedded in rubber or synthetic rubber 8, in the same manner in which the tension section 1 in the construction illustrated in Figures 1 and 2 is formed.

The intermediate, neutral axis section or member 2 is formed of longitudinally inextensible, flexible, articulated metal mesh 9 interlockingly imbedded in rubber or synthetic rubber 8 in the same manner in which the intermediate, or neutral axis section or member 2 of the construction illustrated in Figures 1 and 2 is formed.

The compression section, designated 3a, is formed of superposed layers of spun glass fabric 7 interlockingly imbedded in rubber or synthetic rubber 8 in the same manner in which the tension sections 1 of the constructions illustrated in Figures 1, 2 and 3 are formed.

Instead of the breaker strip 4, in the construction illustrated in Figures 1 and 2, the belt carcass or body is enclosed in a wrapper 4a which extends about all sides thereof and which is formed of one or more layers of spun glass fabric 7 interlockingly imbedded in rubber or synthetic rubber 8.

The form of belt illustrated in Figures 1, 2 and 3 is the side drive type of power transmission belt known as the V-belt, and while the principles of this invention, as illustrated, are particularly adapted for use in the construction of such belts which may be of the type illustrated, or of the type provided with cut-away portions in the compression section 3 thereof to form teeth or cogs for the driving of railway generators and the like, it is, of course, to be understood that the intermediate neutral axis section or member 2 may be entirely omitted or replaced by an intermediate section or member formed entirely of rubber.

Furthermore, where it is desired that the principles of this invention be applied to surface drive belts of flat, relatively thin construction, the entire body of the belt may be formed of superposed layers of spun glass fabric 7 interlockingly imbedded in rubber or synthetic rubber 8 in the same manner in which the tension section 1 of each of the illustrations is formed. In instances where the belt is subjected to fumes, fluids and gases which readily attack and destroy rubber, it is, of course, to be understood that the material 8 shall be so chosen as to provide the ultimate resistance to such attack.

As the spun glass material is completely resistant to attack of such substances and furthermore will not support combustion, it will be seen that, by constructing the belt entirely of synthetic rubber, spun glass material and, optionally, longitudinally inextensible flexible metal mesh, a belt construction is provided which is entirely oil-proof and which will operate satisfactorily in such relations as have hitherto prevented the satisfactory use of belt drive transmission as, for instance, where there is constant leakage of oil and other rubber injurious substances. A belt so constructed may be operated in satisfactory manner though immersed entirely in oil.

While the above description relates to the formation of the belt body of glass fabric or fibers embedded in rubber and synthetic rubber, it is, of course, to be understood that I comprehend the use of other materials which are not technically classed as synthetic rubber, but which are possessed of the requisite properties for use in the practice of this invention. Therefore, the above terms, as used by me, are to be considered comprehensive, rather than exclusive, of such equivalent or comparable materials.

It will be understood that the above-described structure is merely illustrative of the manner in which the principles of my invention may be utilized and that I desire to comprehend within my invention such modifications as come within the scope of the claims and the invention.

Having thus fully described my invention, what I claim as new and desire to secure by Letters Patent is:

1. In an oil-proof power belt, a compression section formed of transversely disposed parallel spun glass fibers interlockingly imbedded in oil-proof synthetic rubber, an intermediate section having the belt neutral axis therein superposed on said compression section and formed of flexible longitudinally inextensible articulated metal mesh interlockingly imbedded in oil-proof synthetic rubber, a tension section superposed on said intermediate section and formed of layers of straight laid square woven spun glass fabric interlockingly imbedded in oil-proof synthetic rubber, and a breaker strip secured to the inside surface of said compression section and comprising straight laid square woven spun glass fabric interlockingly imbedded in oil-proof synthetic rubber.

2. In combination, in a V-belt, of a neutral axis portion comprising metal mesh embedded in a rubber body and tension and compression sections of rubber having transverse glass threads extending from side to side of the belt whereby the metal mesh prevents longitudinal extension of the belt and the transverse glass threads prevent lateral compression of the belt.

3. In combination, in a V-belt, of a neutral axis portion comprising metal mesh embedded in a rubber body and tension and compression sections of rubber having transverse glass threads extending from side to side of the belt whereby the metal mesh prevents longitudinal extension of the belt and the transverse glass threads prevent lateral compression of the belt at least one of the compression and tension sections having the transverse glass threads interwoven with longitudinal glass threads to form one or more layers of straight laid, square woven, rubber embedded fabric.

4. A V-shaped power transmission belt comprising a body of oil-resistant synthetic rubber reinforced with straight laid, square woven glass fabric interlockingly embedded in said rubber and a neutral axis section comprising a relatively large mesh fabric embedded in said rubber, the meshes of said fabric being sufficiently large to permit of cold flow of the rubber therethrough when the belt is bent.

ABRAHAM L. FREEDLANDER.